United States Patent [19]

Leblanc et al.

[11] 4,116,063

[45] Sep. 26, 1978

[54] LIQUID HELIUM-COOLED BOLOMETER WHEREIN THE SENSITIVE ELEMENT AND THE ELEMENTS LINKING THE LATTER TO THE ELECTRICAL CONNECTIONS ARE OBTAINED FROM THE SAME SEMICONDUCTOR BODY

[75] Inventors: Jacques Leblanc, Palaiseau; Gérard Dambier, Elancourt; Noël Coron, Igny; Jean-Pierre Moalic, Plaisir, all of France

[73] Assignee: Agence Nationale de Valorisation de la Recherche, France

[21] Appl. No.: 745,491

[22] Filed: Nov. 26, 1976

[30] Foreign Application Priority Data

Nov. 26, 1975 [FR] France .................. 75 36104
Nov. 26, 1975 [FR] France .................. 75 36103

[51] Int. Cl.² .............................................. G01J 5/20
[52] U.S. Cl. ......................... 73/355 R; 250/352; 338/18
[58] Field of Search ............. 73/355 R; 250/338, 352; 338/18, 22 SD

[56] References Cited

U.S. PATENT DOCUMENTS

| | | | |
|---|---|---|---|
| 2,414,792 | 1/1947 | Becker | 338/18 |
| 2,516,873 | 8/1950 | Havens et al. | 338/18 |
| 3,202,820 | 8/1965 | Norton et al. | 73/355 |
| 3,684,996 | 4/1970 | Schwarz | 73/355 |
| 3,767,928 | 10/1973 | Bishop et al. | 250/338 |
| 3,781,748 | 12/1973 | Bishop et al. | 73/355 X |
| 3,881,181 | 4/1975 | Kaajezadeh | 338/22X |

*Primary Examiner*—Herbert Goldstein
*Attorney, Agent, or Firm*—William Anthony Drucker

[57] ABSTRACT

Bolometer cooled to a very low temperature, wherein the sensitive element has a very low thermal capacity and, for this purpose, a semiconductor crystal extended on two faces by beams made of the same material, but of smaller section, which have been metallized. These metallized beams, wherein the volume of crystal has been reduced to a minimum by their very small section, directly or indirectly provide the thermal link with the cryostat and the electrical link with the measuring circuit making it possible to eliminate all welds using bonding metal on the side of the crystal which forms part of the sensitive element. In a preferred mode of embodiment, the thermal substrate thermally linked to the crystal is a piece of monocrystalline diamond.

10 Claims, 7 Drawing Figures

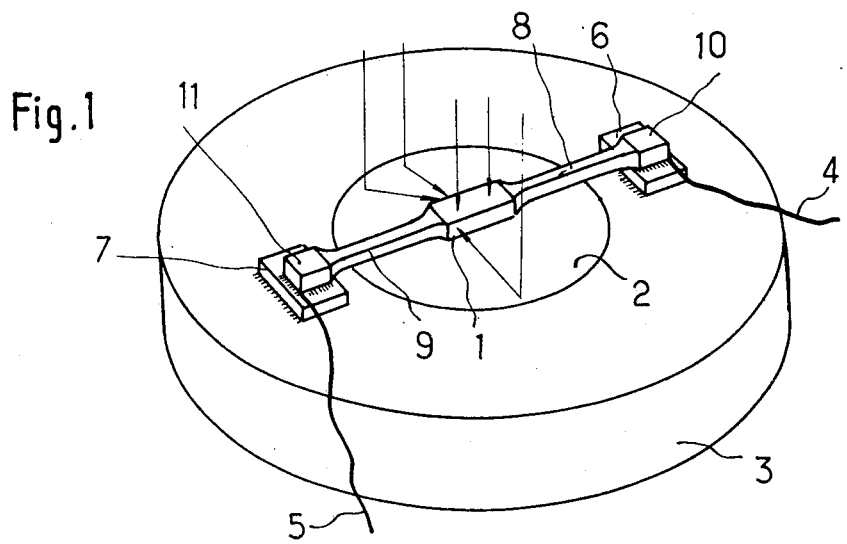
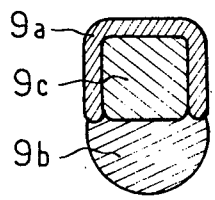
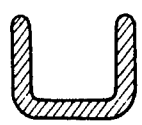
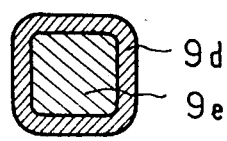
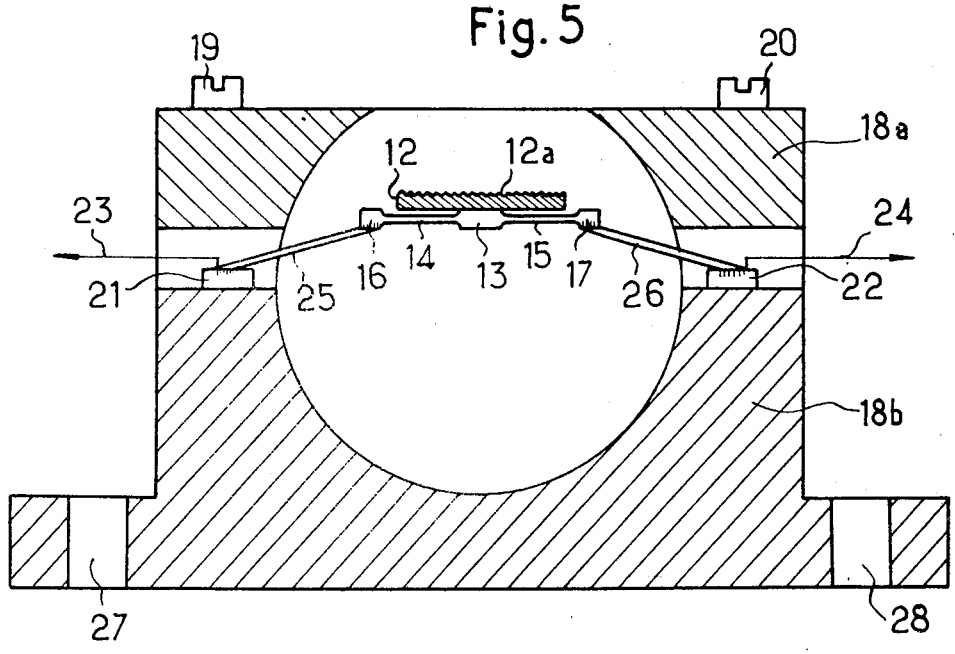

LIQUID HELIUM-COOLED BOLOMETER WHEREIN THE SENSITIVE ELEMENT AND THE ELEMENTS LINKING THE LATTER TO THE ELECTRICAL CONNECTIONS ARE OBTAINED FROM THE SAME SEMICONDUCTOR BODY

The invention relates to bolometers cooled to a very low temperature, of the type comprising a "blackened" thermal substrate absorbing radiation, coupled to a very small semiconductor crystal whose resistance varies according to the temperature. The latter is connected to an amplifying electric circuit converting the crystal's variations in resistance into electric signals. The bolometer unit is mounted on the bottom of a liquid helium-cooled cryostat.

These bolometers are ultra-sensitive and designed in particular for application in astrophysics.

The lower the thermal capacity of the sensitive element at a given modulation frequency, the better their limit of detection.

The electrical connection between the sensitive element and the measuring circuit is usually effected by means of fine metal wires welded on the crystal using indium as the a bonding material. Now, the Applicant has discovered that, in the case of bolometers operating at very low temperatures, the thermal capacity of these metal welds is higher than that of the crystal itself. A relatively large, constant-section crystal has already been used, of which only the centre part is in fact fully subjected to the temperature variations on which detection relies. The welds are then made on non-detecting parts, but the sensitive element has a large unused volume of semiconductor which is not short-circuited by a thermal shunt and which consequently participates in the thermal inertia. It has moreover been proposed, in U.S. Pat. No. 3,202,820 filed on the 28th Jan. 1963 in the names of Bruce Norton and Russel D. DeWaard, to make each of the components connecting with the detector component consist of a conductive contact on the detector component and an insulating fibre fitted with a conductive coating and glued to said contact. The added glue contributes to increasing the thermal capacity of the junction where there are several successive elements.

The aim of the invention is to overcome these difficulties, to make it possible to produce bolometers cooled to temperatures of less than 5 K. with a substantially reduced thermal capacity as compared with those of the prior art.

Its subject is a bolometer of the above-mentioned type, wherein the junction is made without any added material, each of the linking components between the detector component and the electrical connection wires comprising only two elements, viz an extension of the crystal which constitutes the detector component and a conductive surface formed on this extension.

These joints without weld or any other complementary material are preferably formed by depositing metal on extensions of the sensitive crystal, the latter thus finally having a variable section and its geometry being suitable to minimise its volume.

According to a preferred mode or embodiment, the detector component and its extensions are obtained from the same semiconductor bar, shaped by chemical attack so as to form, in its centre part, the component receiving the optical flux and with its intermediate parts thinned to serve as a base for metal deposits.

In a first form of embodiment, the semiconductor of the bar, which then has a U-, I- or T-section, is removed after formation of the metal deposit, while in a variant, the metal deposit is formed on the four faces and the semiconductor is retained inside the bar.

According to another aspect of the invention, the thermal substrate theremally linked to the receiving part of the semiconductor crystal is a piece of monocrystalline diamond.

The thermal substrates used in the prior art consist either of very thin metal sheets or thin, flat discs of silicon or quartz. Their thermal capacity could then become preponderant in relation to that of the junctions between the detector component and the connecting wires, when these have been made in accordance with the invention. Making the substrate of monocrystalline diamond makes it possible to overcome this drawback.

It also makes it possible to make substrates which have a very large total surface area compared with the lead-in area actually used (e.g. 10 times larger), without performance being too much reduced, which allows "absolute" detectors having very good performance to be made, which can be used for calibrating.

The applicant has found that the diamond can be cut into tablets of sufficiently large diameter (1 to 8 mm) of the very small thicknesses necessary (a few dozen microns) and that besides its very low thermal capacity, it possesses considerable thermal diffusivity, which prevents temperature gradients at high modulation frequencies. The result is, in the application envisaged, that high modulation frequencies of the incident radiation can be used, e.g. up to several dozen KHz with a substrate with a diameter of several millimetres, without loss of sensitivty.

In its application to absolute radiometry, the bolometer according to the invention is characterised by a non-flat substrate, relatively large in volume, preferably in the form of a hollow, thin-walled cylinder with a closed bottom, obtained by working a natural diamond.

In accordance with a preferred mode of embodiment, the detector crystal is coupled to said substrate along a portion of flat surfaces of the diamond and the sensitive element so formed is suspended inside a spherical reflecting cavity with an aperture covered by a diaphragm to receive the flux to be measured.

Other characteristics, as well as the advantages of the invention, will emerge clearly from the following description.

In the attached drawings:

FIG. 1 is a diagrammatic view of a bolometer with a one-piece sensitive element, in accordance with a first mode of embodiment of the invention;

FIG. 2 is a sectional view of a metal beam during manufacture;

FIG. 3 is a sectional view of a metal beam without a semiconducting core;

FIG. 4 is a sectional view of a metal beam with a semiconducting core;

FIG. 5 is a diagrammatic view of a bolometer with a composite sensitive element, in accordance with a preferred mode of embodiment of the invention for detectors with a diameter exceeding 0.8mm;

FIG. 1 shows diagrammatically the sensitive element and the thermostat of a bolometer comprising no thermal substrate. It is a face of the crystal itself which is blackened.

Figure 6:
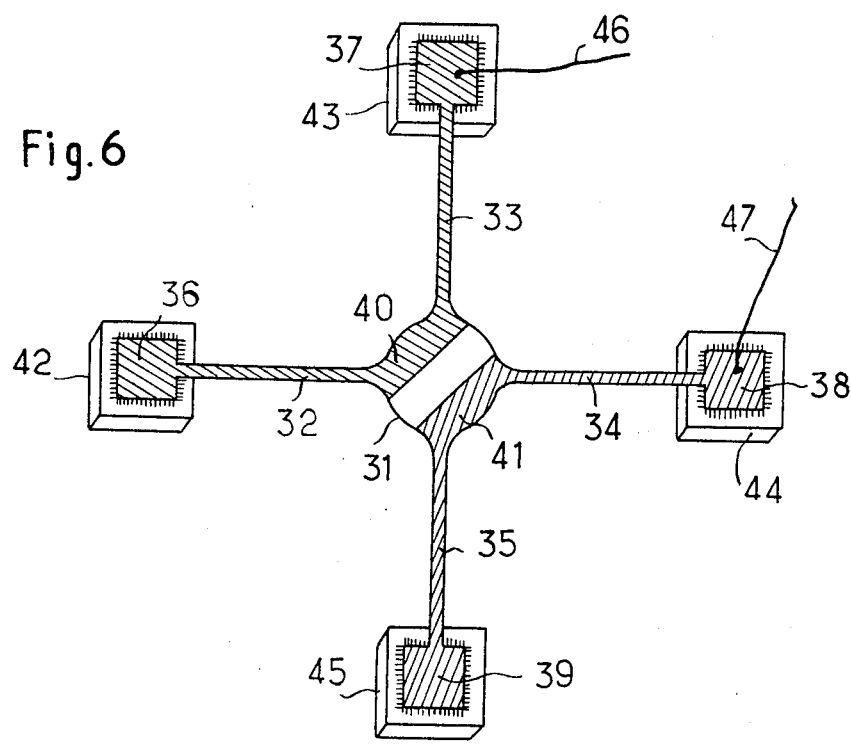
FIG. 6 is a diagrammatic view of the sensitive element of a bolometer wherein the crystal and the bases for the metal deposits are obtained by chemical attack on a thin plate of semiconducting crystal, to form a cross-shaped pattern.

The latter comprises a centre part 1, parallelepiped in shape. Insulating black can be deposited on the infra-red flux impact surface (symbolised by arrows).

By way of variant (not shown), a resistive absorbent can be deposited on an intermediate insulating layer, e.g. of silica, itself deposited on suitable portions of the surface of part 1. The flux is directed by an optical system, not shown, and by a concave mirror 2 housed in a central hollow in the ultra-pure copper base 3, coupled in a way not shown to a cryostate containing liquid helium.

The measuring circuit which the apparatus comprises is standard and has not been shown. It is electrically connected to the sensitive element by two fine metal wires 4 and 5, welded, with indium, to two monocrystalline quartz tablets 6 and 7, metallised on both their faces and themselves welded to the base 3. These tablets electrically insulate the wires and the sensitive element from the base 3, while providing very good thermal conduction between the latter and the sensitive element, which is to be cooled by the cryostat.

The sensitive element comprises two beams 8 and 9 which connect its centre part 1 to its parallelepiped extremities 10 and 11, which are welded to the respective quartz tablets.

Base 3, tablets 6 and 7 and extremities 10 and 11 of beams 8 and 9 constitute a thermostat, i.e. they undergo practically no thermal fluctuations as a function of the flux received, while the unit 1-8-9 constitutes the element which is sensitive to thermal fluctuations, of which only the centre part 1 acts as a detector.

By way of example, the sensitive element is made in the following way.

The starting point is a bar of semiconductor (e.g. doped silicon or germanium), 10mm long and having a square section with 300-micron sides. By acid attack, monitored under a microscope, on parts 8 and θ (parts 1, 10 and 11 being protected), these intermediate parts are brought to the shape of beams whose section is, at the thinnest part, a square with 30-micron sides.

Metallisation is then carried out, either by evaporation in a vacuum or by electroforming, on three faces of the beams, the fourth face being protected by an insulating cladding. The extremities 10 and 11 are also metallised.

In FIG. 2 this metallisation, with a U-section, is shown at 9a, while 9b is the cladding and 9c the semiconductor.

It is then sufficient to dissolve the cladding, then to remove the semiconductor 9c by acid attack, to obtain, between the centre part 1 and the extremities 10 and 11 made of semiconductor, two intermediate metal beams, with a U-section (FIG. 3), 50-micron sides (external dimension) and 0.5 to 10 microns thick, according to the thermal conductivity sought. Of course, these numerical indications are non-limiting. The metal used will advantageously be doped gold to obtain the same $p$- or $n$-type as the sensitive crystal.

It should be pointed out that the intermediate beams simultaneously provide the electrical connection between the active centre part of the sensitive element, rigid mechanical connection and a thermal connection whose impedance can be optimized by selecting the metal suitably and adjusting the thickness of the deposit. It will be noted that the joints between the sensitive crystal and the metal deposits on the beams have a relatively large surface, the section of the beams decreasing gradually from the joint onwards. Current distribution is substantially homogeneous over the whole of the surface of the joint. These largesurface electric contacts, made without local heating, have very low noise.

The centre part 1 acts as a detector part coupled to the thermal substrate.

The extremities can, in some cases, be omitted, the connecting wires and the quartz tablets then being directly welded on to the intermediate beams.

Of course, the forms shown are not limitative, the two beams can, for example, be fixed on the same side of the centre part, suitably shaped for the purpose. The section of the metallised beams could be I- or T-shaped.

By way of variant, FIG. 4 shows the section of a full beam comprising a metal deposit 9d which completely surrounds a semiconductor core 9e. The procedure for making such a beam is the same as described above, but metallisation is applied to all faces of the parts of the semiconductor bar with a reduced section and the semiconductor core is not acid-destroyed. The thermal resistance constituted by the beams can then be adjusted by selecting the semiconductor dropout additive and by calibrating the section or the length.

FIG. 5 is a diagrammatic view of the thermostat and the sensitive element of a bolometer wherein the detector part of the crystal 13 is coupled by glueing to a large thermal substrate.

The sensitive crystal is made by one of the two methods described above, e.g. the active part 13 is in the general shape of a cube with 300-micron sides, two intermediate beams 14 and 15 and two extremities 16 and 17.

The beams 14 and 15 consist e.g. of a hollow metal section with 50-micron sides.

The substrate 12 is a tablet cut as thin as possible (thickness less than 100 microns) from a natural diamond selected in such a way that the circle with the required final diameter is marked out in the rough cut section. In other words, the contour of the "tablet" will not be circular, or even regular, since it is better to obtain a very thin tablet free from incipient breaks than a tablet with a regular contour which is thicker or has such incipient breaks. For example, it has been possible to obtain 80-micron thick tablets with a diameter of 5mm.

The rear face (to which the crystal will be coupled) is covered, by vacuum deposition, with a layer of nickelchrome alloy of such a thickness that the resistance ($R_o$) is approximately 110 ohms, being thus suited to the diamond index (2.38) and the vacuum impedance so as to obtain maximum absorption.

The forward face can be covered with a layer of standard absorbent material 12a to improve the efficiency of the detector.

The thermal coupling of the tablet 12 to the crystal 13 is obtained either by glueing or by welding on a point on the rear face, reinforced by electrolytic gilding.

The thermal capacity of the diamond being, at the very low temperatures at which it is used, about one-tenth of that of pure silicon, performances can be multiplied by three.

The sensitive element is positioned in the centre of a spherical cavity formed in an ultra-pure copper body consisting of two parts 18a and 18b held together by screws 19–20. Monocrystalline quartz tablets 21 and 22, metallised on both faces, enable the connecting wires 23 and 24 to be welded to the measuring circuit and provide, via two rigid copper or gold beams 25 and 26, welded to the tablets 21–22 and the extremities 16–17, the thermal connection between the sensitive element and the copper body. The latter is itself in contact with the cryostat through its base, which comprises holes 27, 28, designed to take the connecting components.

It should be stressed that by using, to make the beams, electrolytic deposits less than 1 micron thick and by reducing to a minimum the volume of the semiconductor (e.g. 50 cubic microns), considerably better performance can be achieved than with prior art bolometers.

The electrical contacts, as has already been explained, have very low noise. the absence of manual welding operations prevents disturbing the semiconductor in depth and makes it possible considerably to reduce its volume. It also allows particularly reliable mass production.

FIG. 6 shows a plane view of a sensitive element obtained in the following way.

Acid attack is applied to a thin (e.g. 30 microns) semiconductor with a large surface area (e.g. square plate with 10 mm sides). A protective mask makes it possible to obtain a one-piece semiconductor comprising a centre tablet 31 extended by four strips 32 to 35 forming a cross, themselves terminated by plates 36 to 39. This one-piece unit is covered with a metal deposit on one face. It can be seen that this deposit forms two separate metallisations. One covers one face of elements 32–36 and 33–37, as well as an area 40 of the centre tablet; the other covers one face of the elements 34–38 and 35–39, as well as another area 41 of the centre tablet.

The plates 36 to 39 are welded on quartz plates 42 to 45, connected to the cryostat as described above. The plates 37 and 38 are connected to the measuring circuit by wires 46, 47.

In addition to its easy production, this mode of embodiment has the advantage of good mechanical performances, due to the small bulk of the centre tablet 31 and the presence of four points to anchor the sensitive element to the cryostat. The sensitive portion (non-metallised area of tablet 31) can have a large surface area, which is useful for the detection of distant infra-red. Thermal conductivity is increased by the presence of four thermal leaks 32 to 35. Only the metallised strips 33 and 34 act as electrical connections: they lead to two large contact surfaces 40 and 41 where current distribution is homogeneous.

In the assemblies illustrated in FIGS. 1, 5 and 6, the joint between the metal elements which constitute calibrated thermal leaks and the sensitive crystal comprises a spread leading gradually to a large contact surface (not necessarily flat). The current is thus distributed symmetrically and hologeneously over an equipotential front in the sensitive crystal. Moreover, surface effects on the sensitive crystal can be reduced to a minimum by the cleanliness of these contacts: the sensitive, non-metallised part of the crystl can be cleaned again with acid after formation of the metal deposit.

Figure 7:
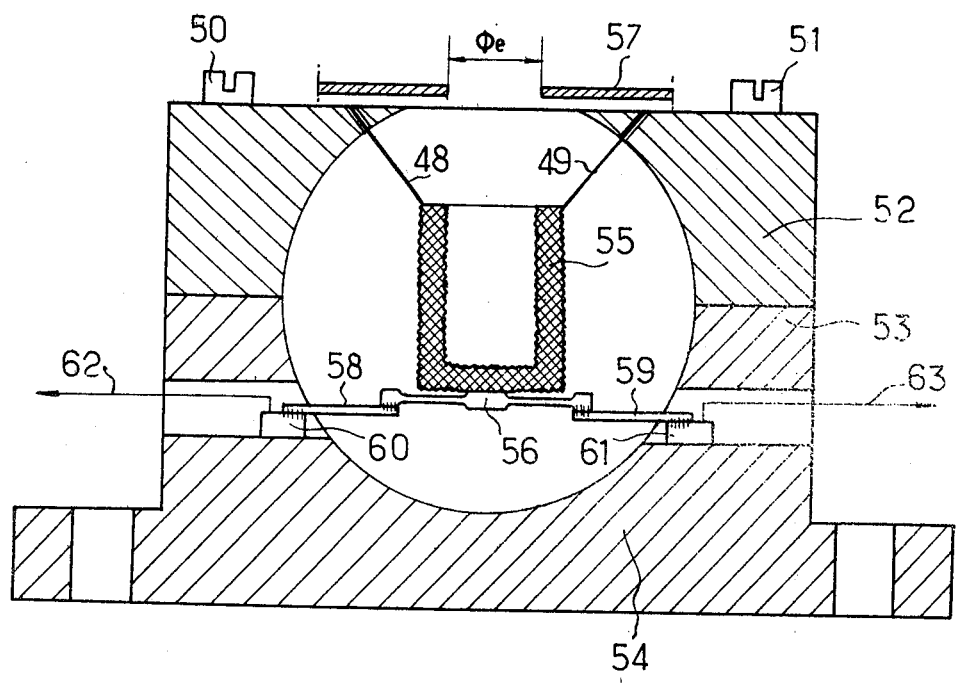
FIG. 7 is a diagrammatic view of an absolute bolometer with a cylindrically shaped substrate.

FIG. 7 shows, inserted in a reflective spherical cavity consisting of three ultra-pure 52–54 copper parts held together by means of screws 50–51, a sensitive element consisting of a piece of diamond 55 with a relatively large volume and a detector crystal 56.

The diamond thermal substrate 55 is advantageously suspended from the part 52 by means of four insulating wires such as 48–49 made of smelted silica and the electrical and thermal connection of the crystal 56 is advantageously in accordance with the description.

The substrate 55 is obtained by working the outer and inner surfaces of a natural diamond and is in the form of a hollow cylinder closed at one end. The averge thickness of its wall is, e.g., of the order of 100 microns.

The detector crystal 56 is of the type described above and glued by its centre part to the bottom of the cylinder.

It is connected, as in the example in FIG. 4, by two rigid beams 58–59 made of copper or gold, to metallised quartz plates 60–61, themselves welded to part 54. The connection between the crystal 56 and the beams 58 and 59 is itself effected by welding. The connecting wires to the measuring circuit, 62 and 63, are welded to plates 60–61.

The inner and outer surfaces of the diamond are covered with an absorbent material of the resistive or diffusing type, suited to the wavelength on which the bolometer is used.

The reflective spherical cavity comprises an opening covered by a diaphragm 57 with a diameter of $\phi_e$. A ratio of 10 can, for example be obtained between the inner surface of the diamond and the lead-in surface with a diameter $\phi_e = 2mm$, which leads to a theoretical bolometer efficiency which may exceed 98%, after taking into account reflection losses.

The result of the hollowing-out of the diamond is a considerable reduction of the volume, and thus of the thermal capacity, and a notable increase in the absorbent surface.

Finally, the cavity obtained acts as a radiation trap: performance and efficiency are thus substantially increased.

A calibration bolometer of this type will be very useful for the detection and absolute measurement of the infra-red flux.

We claim:

1. An ultra-sensitive bolometer comprising : a Thermal sink ; means for cooling the said thermal sink at a temperature lower than 5° K.; a semi-conductor crystal body having a central portion which is liable to temperature variations as a function of radiation to which the bolometer is subjected , said semi-conductor crystal body further having first and second elongate extensions ; first and second electrically conductive layers on said first and second extensions, said layers extending from said central portion respectively to first and second regions in which the said temperature variations are negligibly small; and layers making direct ohmic contact with said central portion without any additional bonding material between said layers and said central portion, said elongate extensions having a cross-section which is gradually decreasing; from said central portion in the directions of said regions, said elongate extensions and said layers having a predetermined thermal resistance ; rigid means thermally and mechanically connecting the said regions to the thermal sink ; first and second externally extending electrical leads respectively connected to said regions.

2. Bolometer according to claim 1, further comprising a thermal substrate covered with an absorbent and thermally connected to the detector crystal body, said thermal substrate being a piece of mono-crystalline diamond.

3. Bolometer according to claim 2 characterised in that the detector crystal body is coupled to said substrate along a flat portion of the surface of the piece of diamond.

4. Bolometer according to claim 2 characterised in that the thermal substrate is a thin diamond tablet a few millimetres in diameter and less than 100 microns thick.

5. Bolometer according to claim 2 characterised in that the thermal substrate is a natural diamond shaped into a hollow cylinder with a thin wall and a closed bottom.

6. An ultra-sensitive bolometer as claimed in claim 1, wherein said layers are shaped as gutters having unsupported portions beyond the elongate extensions, said regions being located in the said unsupported portions.

7. An ultra-sensitive bolometer as claimed in claim 1, wherein ohmic contact is established between said layers and a comparatively large portion of the surface of the said central portion.

8. Bolometer according to claim 1 characterized in that said semiconductor body is a thin semiconductor crystal plate shaped to constitute four thin elongated extensions arranged in a cross around said central portion, a metal deposit forming on said central portion two separate conductive areas, to each of which metal deposits made on two of said elongate extensions are integrally connected.

9. An ultra-sensitive bolometer comprising : a thermal sink ; means for cooling the said thermal sink at a temperature lower than 5° K. , a semiconductor crystal body liable to temperature variations as a function of a radiation to which the bolometer is subjected ; first and second electrically conductive elongate members each extending from the semi-conductor crystal body to a region in which the said temperature variations are negligibly small, said elongate members making direct ohmic contact with said semiconductor crystal body without any additional bonding material between said elongate members and said body ; said elongate members having a cross-section which is gradually decreasing from said body in the direction of said regions, said elongate members having a predetermined thermal resistance ; rigid means thermally and mechanically connecting the said regions to the thermal sink and first and second externally extending electrical leads respectively connected to said regions.

10. An ultra-sensitive bolometer as claimed in claim 9, wherein ohmic contact is established between said elongate members and a comparatively large portion of the surface of said semi-conductor crystal body.

* * * * *